United States Patent [19]

Klaver et al.

[11] Patent Number: 5,409,718
[45] Date of Patent: Apr. 25, 1995

[54] METHOD FOR THE PREPARATION OF A FERMENTED MILK PRODUCT

[75] Inventors: Franciscus A. M. Klaver, Ede; Jacobus J. Stadhouders, Bennekom; Fedde Kingma, Ede, all of the, Netherlands

[73] Assignee: Nederlands Instituut Voor Zuivelonderzoek, Ede, Netherlands

[21] Appl. No.: 936,733

[22] Filed: Aug. 31, 1992

Related U.S. Application Data

[63] Continuation of Ser. No. 653,422, Feb. 11, 1991, abandoned.

[30] Foreign Application Priority Data

Feb. 21, 1990 [NL] Netherlands ............... 9000422

[51] Int. Cl.⁶ ............................................... A23C 9/12
[52] U.S. Cl. ........................................ 426/42; 426/34; 426/43; 426/583
[58] Field of Search ............... 426/34, 42, 43, 580, 426/583, 36, 38, 40, 521, 522

[56] References Cited

U.S. PATENT DOCUMENTS

| | | |
|---|---|---|
| 3,985,901 | 10/1976 | Barberan . |
| 4,410,549 | 10/1983 | Baker ............................. 426/43 |
| 4,425,366 | 1/1984 | Sozzi et al. ...................... 426/43 |
| 4,870,020 | 9/1989 | Sozzi ............................... 426/42 |
| 4,913,913 | 4/1990 | Takano et al. .................. 426/42 |
| 4,938,973 | 7/1990 | Klaver et al. ................... 426/42 |
| 4,954,450 | 9/1990 | Brothersen et al. ............ 426/42 |
| 5,098,721 | 3/1992 | Kosikowski ..................... 426/61 |

FOREIGN PATENT DOCUMENTS 2197521  3/1974  France .

OTHER PUBLICATIONS

"Lactic acid production by *Streptococcus lactis* and *Streptococcus cremoris* in milk precultured with psychrotrophic bacteria", *Journal of Food Protection*, vol. 40, No. 6, Jun. 1977, pp. 406–410, Fig. 1–International Assoc. of Milk . . . .

"Symbiosis in yoghurt (I). Stimulation of *Lactobacillus bulgaricus* by a factor produced by *Streptococcus thermophilus*", *Neth. Milk & Dairy J.* vol. 22, 1968, by Th. E. Galesloot et al.

"Yoghurt, II. Groeifactoren voor *Sc. thermophilus*", *Neth. Milk & Dairy J.* vol. 4, 1950 (Amsterdam, NL) by J. W. Pette et al. pp. 209–224.

*Primary Examiner*—Donald E. Czaja
*Assistant Examiner*—Leslie Wong
*Attorney, Agent, or Firm*—Young & Thompson

[57] ABSTRACT

The invention relates to a method for the preparation of a fermented milk product, such as yoghurt, wherein milk is incubated with a thermophilic Lactobacillus, followed by destroying of the Lactobacillus and optionally adding non-incubated milk, and wherein the milk is then incubated with a Streptococcus.

10 Claims, No Drawings

METHOD FOR THE PREPARATION OF A FERMENTED MILK PRODUCT

This application is a continuation of application Ser. No. 07/653,422, filed Feb. 11, 1991, now abandoned.

FIELD OF THE INVENTION

The invention relates to a method for the preparation of a fermented milk product by fermentation of milk with at least one bacterium of the genus Lactobacillus, in particular the species *L. delbrueckii,* subspecies *bulgaricus*, and one bacterium of the genus Streptococcus, in particular of the species *S. thermophilus.*

BACKGROUND OF THE INVENTION

It is known that a series of products which are very attractive to the consumer can be obtained by fermentation of milk with microorganisms. A review of the prior art is given in Bulletin of the International Dairy Federation No. 227/1988. The large number of suitable species of microorganisms offers the possibility of a wide variation in texture and in the taste of the end product; the technique employed also has a great influence on the texture. A common characteristic is that the product contains live microorganisms.

Many of these products contain, optionally in addition to other microorganisms, a combination of *Lactobacillus delbrueckii* subspecies *bulgaricus,* and *Streptococcus thermophilus.* This combination forms the basis for the preparation of yoghurt-like products. Protocooperation occurs in this preparation: if these species are cultured together they stimulate one another's growth. Together they provide the characteristic texture and taste of yoghurt. The customary culture temperature is between 32° and 45° C.; the inoculation percentages vary from 0.025 to 5%.

However, a problem arises in the case of fermentation with said cooperative combination: as the result of the continuing formation of acid and the progressive degradation of protein as a consequence of the presence of the lactobacillus a sour and/or bitter taste can develop when the product is stored. The lactobacillus is, however, indispensable because of its contribution to the flavour and its production of compounds which stimulate the growth of the streptococcus; it is precisely because of the cooperation that a sufficiently rapid formation of acid is achieved which is important for the texture of the product.

Attempts have been made to solve this problem by pasteurizing the product after preparation; however, it is found that an adequate texture can then be maintained only with the aid of added thickeners (Zuivelzicht 38 (1982) 852–854). Of course, the product then also no longer has the characteristic of the presence of live microorganisms in the product ready for consumption.

Attempts have also been made to arrive at a solution to the problem by preparing a product such as yoghurt without the lactobacillus (J. Dairy Research 49 (1982) 147). In order to compensate for the lack of metabolites of the lactobacillus, which results in a poor growth of the streptococcus, growth stimulants such as hydrolysed casein are then added. However, these stimulents differ from the protein fragments which are formed as a result of the action of the lactobacillus; consequently, the contribution of the lactobacillus to the taste is missing and, in respect of the taste, the products can then also be differentiated from those products in which the lactobacillus and the streptococcus have been grown together. Moreover, there is a desire in the foodstuffs industry to avoid as far as possible additives which are obtained by chemical processing.

In European Patent EP 0,148,299 a method is described in which lactobacilli are added, but only after the acidification by the streptococcus in the presence of stimulants, which are not described in more detail, has gone to completion. In this case also there can be no question of protocooperation.

A solution to the problem of continuing acidification and progressive protein degradation due to the presence of the lactobacillus is given in European Patent Application EP-A 0,322,010. According to the method described in this publication, the lactobacillus and the streptococcus are cultured in a fermenter, separated from one another by a semipermeable membrane; free exchange of substances with a relatively low molecular weight takes place between the two compartments. The product which is tapped from the compartment which contains the streptococcus is found to be fully comparable in respect of taste and texture with the fresh product prepared in the traditional way. However, a disadvantage of this method is that special equipment, which is not available in traditional dairy companies, is required to carry it out.

SUMMARY OF THE INVENTION

It has now been found that it is possible to prepare a product such as yoghurt which is fully comparable with the corresponding product prepared in the traditional way, without pasteurizing the product and without the use of equipment other than the conventional dairy equipment, by inoculating milk with a thermophilic lactobacillus, incubating and then treating it in such a way that the lactobacillus is destroyed and then using the product as a substrate for at least the streptococcus.

In this context, milk must be understood as meaning any raw material suitable for the preparation of fermented milk products; primarily cows' milk, but also milk from other mammals, such as horses, sheep or goats. The milk may be full-fat, but also skimmed or partially skimmed; in some cases constituents such as water or casein will have been removed from the milk, but milk constituents—in particular in the form of ultrafiltration retentate—may also have been added.

A thermophilic lactobacillus is understood to be a lactobacillus having its optimum growth at temperatures above about 30° C.

The invention relates to the preparation of products in which the protocooperation between a thermophilic lactobacillus and a streptococcus plays a role. Usually the lactobacillus used will be *Lactobacillus delbrueckii,* subspecies *bulgaricus,* and the streptococcus *Streptococcus thermophilus.* If desired, the *Lactobacillus delbrueckii* subspecies *bulgaricus,* can be replaced, for example by *Lactobacillus helveticus,* which likewise forms a protocooperative combination with *Streptococcus thermophilus.* Moreover, the invention is not restricted to the preparation of yoghurt but is also applicable to the preparation of products in which, in addition to the protocooperative combination, yet further microorganisms play a role. Known examples of the said further microorganisms are Bifidobacterium species and Lactobacillus species such as *L. casei* and *L. acidophilus.*

In the dairy industry a differentiation is made in principle between two types of yoghurt-like products; the Stirred product and the set product. Thus, stirred yoghurt is obtained by incubating milk in a tank with the necessary bacterial culture, then stirring until a smooth, homogeneous product has been obtained and packaging this product, while set yoghurt is prepared by incubating the inoculated milk in the packaging. When the method according to the invention is used, the milk inoculated with the streptococcus will first be incubated, then stirred until smooth and finally packaged in order to obtain stirred yoghurt, while the milk inoculated with the streptococcus will be incubated in the final packaging in order to obtain set yoghurt.

DETAILED DESCRIPTION OF THE INVENTION

The method according to the invention can be represented as a number of successive steps:

a. A culture of a lactobacillus, in particular *L. delbrueckii* subspecies *bulgaricus*, is inoculated into the milk and cultured. The percentage inoculation and the culture temperature are those which are customary in the traditional preparation of yoghurt: 0.025–5% and 32°–45° C. respectively; preferably, however, the percentage inoculation is between 2 and 3% and the culture temperature is between 40° and 45° C.

b. The fully grown lactobacillus culture is heated in such a way that the bacteria present are destroyed. Because it is important that the heated suspension not only contains no living bacteria but also has little or no enzymatic activity, it is preferred to choose a temperature and time combination for this step which has at least the same effect as heating for 1 minute at 85° C.

c. A culture of *S. thermophilus* is then inoculated into the suspension of destroyed lactobacilli, which is optionally mixed with non-incubated milk, and incubated. In this step also the percentage inoculations and culture temperatures customary in the traditional preparation of yoghurt are employed. The incubation is continued until the pH value desired for the particular product has been reached. For the preparation of stirred yoghurt a suitable procedure is, after inoculating with *S. thermophilus* culture, to culture at 37° C. until a pH value of 4.4 is reached.

d. When the product has reached the desired pH value, the product is cooled, stirred if necessary and, if desired, mixed with additives such as fruit.

The suspension of destroyed lactobacilli which is obtained according to steps a and b can be used as such as the substrate for *S. thermophilus* and any other microorganisms; preferably, however, before inoculation with the streptococcus, the suspension is mixed with non-incubated, pasteurized milk. Although growth stimulation of the streptococcus is already discernible with a mixing ratio of 1 part of suspension to 200 parts of non-incubated milk, as can be seen from Table 1, mixing ratios of higher than 1 to 50 are to be preferred.

TABLE 1

Effect of mixing ratio of milk incubated with lactobacillus to non-incubated milk on the rate of acidification of streptococcus culture

| Lactobacillus culture (ml) | Non-incubated milk (ml) | Rate of acidification (-ΔpH/6 hours) |
| --- | --- | --- |
| 0 | 2000 | 0.70 |
| 10 | 2000 | 1.00 |
| 20 | 2000 | 1.10 |
| 40 | 2000 | 1.46 |
| 100 | 2000 | 1.94 |

Instead of using the lactobacillus culture as such, the suspension of destroyed lactobacilli can also be first dried; methods for drying material of this type are known to those skilled in the art. Thus, the suspension can first be concentrated by evaporation and then dried by spray-drying. The material obtained in this way can then, independently of the location of the production thereof, be suspended as powder in milk in order to prepare a substrate for the streptococcus. Preferably, with this procedure, amounts of between 1 and 15 g of the dried material per liter of milk are used; for a mixing ratio of about 0.5 g of powder to 1 liter of milk stimulation of the growth of the streptococcus is, incidentally, already found to occur.

Although it is possible to apply the method according to the invention by using the relatively highly acid suspension of destroyed lactobacilli mixed with milk as substrate for the streptococcus, it is preferred to bring the lactobacillus culture to a pH value of at least 5.8 during or after culture. The culture method which is known as "neutral culture" may be used for this purpose: if the pH has fallen to, for example, 5.8 during the incubation of the lactobacillus culture, this value is maintained during the further incubation by adding neutralizing agents such as ammonia, dilute alkali or lime water. After the incubation is complete, the pH of the suspension can, if desired, be brought to the initial value using one of the said agents.

Formate stimulates the growth of *L. delbrueckii* subspecies *bulgaricus* (Th. E. Galesloot, F. Hassing and H. A. Veringa, Neth. Milk Dairy J. 22 (1968) 50–63). Preferably, the formate content is above 15 mg per kg of milk; if necessary, the content can be brought above the said value by adding formate.

Growth stimulation such as that caused by the presence of formate can also be obtained by subjecting the milk, prior to inoculation with the lactobacillus, to a heat treatment which at least corresponds to heating at 110° C. for 10 minutes.

Of course, in the culture of the lactobacillus use can be made of the above-mentioned stimulation of the lactobacillus growth by the streptococcus. In this case, inoculation and culture in the above-mentioned step a is with both *L. delbrueckii* subspecies *bulgaricus*, and *S. thermophilus* for a time which corresponds to or is shorter than that for the traditional preparation of yoghurt. In step b all bacteria are then destroyed and, optionally after drying and adding non-incubated milk, the material thus obtained is inoculated with *S. thermophilus* (steps c and d).

The culture time is found to influence the organoleptic quality of the end product. A relatively short culture time, for example 38 hours at 37° C., is sufficient to produce a good texture of the end product, but only on prolonged incubation, for example 70 hours or longer at 37° C., is the end product found to contain more acetaldehyde, which results in a clear intensification of the flavour of the end product.

All products for which the protocooperation of *L. delbrueckii* subspecies *bulgaricus*, or *L. helveticus* with *S. thermophilus* plays a role in the production can be prepared by the present method. Not only products such as stirred yoghurt or set yoghurt, in which exclusively the said species typify the product, but also products in which microorganisms other than *S. thermophilus*, such as *L. acidophilus* or *Bifidobacterium bifidum*, also play a role can be prepared using the method according to the invention. Thus, it is very attractive to eliminate the adverse effect of a growing *L. delbrueckii* subspecies *bulgaricus*, on the growth of *L. acidophilus* (J. Food Prot. 40 (1977) 760) by using the method according to the invention in the preparation of acidophilus yoghurt by mixing a suspension of destroyed lactobacilli with milk and inoculating and incubating this mixture with *S. thermophilus* and *L. acidophilus*.

The invention is illustrated by the following examples.

EXAMPLE I 2000 ml of full-fat milk were kept at 110° C. for 10 minutes, then cooled to 45° C. and inoculated with 2.5% (v/v) fully grown culture of *Lactobacillus delbrueckii* subspecies *bulgaricus*, strain Ib (CBS No. 903,87). The mixture was incubated at 45° C. until the pH had reached a value of 5.7 (time taken about 3 hours). The mixture was then brought to the original pH value of 6.5 by adding a solution of NaOH (1 molar) and heated at 85° C. for 1 minute.

After cooling the mixture to 37° C., 2.5% (v/v) of a fully grown culture of *Streptococcus thermophilus* strain Sts (CBS No. 904,87) were added to the mixture and this culture was incubated at 37° C. until a pH value of 4.4 was reached (time taken about 14 hours). The product was stirred until a smooth mass was obtained and cooled to 7° C. The product had a texture and flavour fully comparable with those of a yoghurt prepared by the traditional method; the pH value was 4.3.

The product was then stored for 14 days at 7° C.; at the end of this period the pH was found to be 4.2.

EXAMPLE II 2000 ml of full-fat milk were kept at 100° C. for 30 minutes. then cooled to 37° C. and inoculated with 2.5% (v/v) of a fully grown culture of *Lactobacillus delbrueckii* subspecies *bulgaricus*, strain Ib. The mixture was incubated at 37° C.; when the pH had reached a value of 5.8, this value was maintained during further culture by adding a mixture of NH$_3$ (5% m/v) and NaHCO$_3$ (20% m/v) in water. After a total culture time of 142 hours, the mixture was heated at 85° C. for 1 minute and then cooled. 100 ml of the mixture thus obtained were added to 2000 ml of full-fat, highly pasteurized (5 min/85° C.) milk; the mixture was then inoculated with 2.5% (v/v) of a fully grown culture of *Streptococcus thermophilus* strain Sts, after which the mixture was incubated at 37° C. until a pH value of 4.4 was reached (time taken about 8 hours). The product was stirred until a smooth mass was obtained and cooled to 10° C. The texture and flavour of the fresh, cooled product were fully comparable with those of a yoghurt prepared by the traditional method. The pH of the fresh product was 4.3.

The product was then stored for 14 days at 7° C.; at the end of this period the pH was found to be 4.2.

EXAMPLE III (comparative example)

For comparison, yoghurt was prepared in the manner customary in the Netherlands dairy industry.

2000 ml of full-fat milk, which had been heated at 85° C. for 5 minutes, were inoculated, after cooling to 32° C., with 0.025% (v/v) of a mixture of the commercially available yoghurt strains Ist and RR (mixing ratio 1:1) (these strains are obtainable from Coöperatieve Stremsel-en Kleurselfabriek, Leeuwarden). The mixture was incubated at 32° C. until the pH had reached a value of 4.4 (time taken about 15 hours). The product was then stirred until a smooth mass was obtained and cooled to 10° C. The pH of the fresh, cooled product was 4.3.

The product was then stored for 14 days at 7° C.; during this period the pH fell to a value of 3.9.

We claim:

1. Method of making a fermented milk product for human consumption, consisting essentially of: a) inoculating milk with a thermophilic Lactobacillus microorganism, b) incubating the inoculated milk, c) heating the incubated milk so that the Lactobacillus is destroyed, d) further inoculating the milk with a Streptococcus microorganism capable of protocooperation with a thermophilic Lactobacillus, and e) incubating the further inoculated milk.

2. The method according to claim 1, wherein the Lactobacillus microorganism is *Lactobacillus delbrueckii* subspecies *bulgaricus* or *Lactobacillus helveticus*, and wherein the Streptococcus microorganism is *Streptococcus thermophilus*.

3. The method according to claim 2, wherein the milk inoculated in step a) is mixed with non-incubated milk after said heating step c).

4. The method according to claim 3, wherein one part of milk incubated in step b) is mixed with 0.1–50 parts of non-incubated milk.

5. The method according to claim 3, wherein, after said heating step but prior to said step d), the inoculated milk is dried.

6. The method according to claim 2, wherein the pH of the milk inoculated in step a) is adjusted to at least 5.8 during or after said incubating step b).

7. The method according to claim 2, wherein the milk inoculated in said inoculating step a) contains at least 15 mg of formate per kg.

8. The method according to claim 2, further comprising pre-treating the milk by heating for 10 minutes at 100° C., prior to said inoculating step a).

9. The method according to claim 1, wherein step e) is conducted at a temperature of about 37° C.

10. The method according to claim 1, wherein said thermophilic Lactobacillus microorganism has its optimum growth at temperatures above about 30° C.

* * * * *